No. 838,967. PATENTED DEC. 18, 1906.
C. DUNCAN.
MEANS FOR ATTACHING WHEELS TO AXLES.
APPLICATION FILED NOV. 23, 1905.
2 SHEETS—SHEET 1.
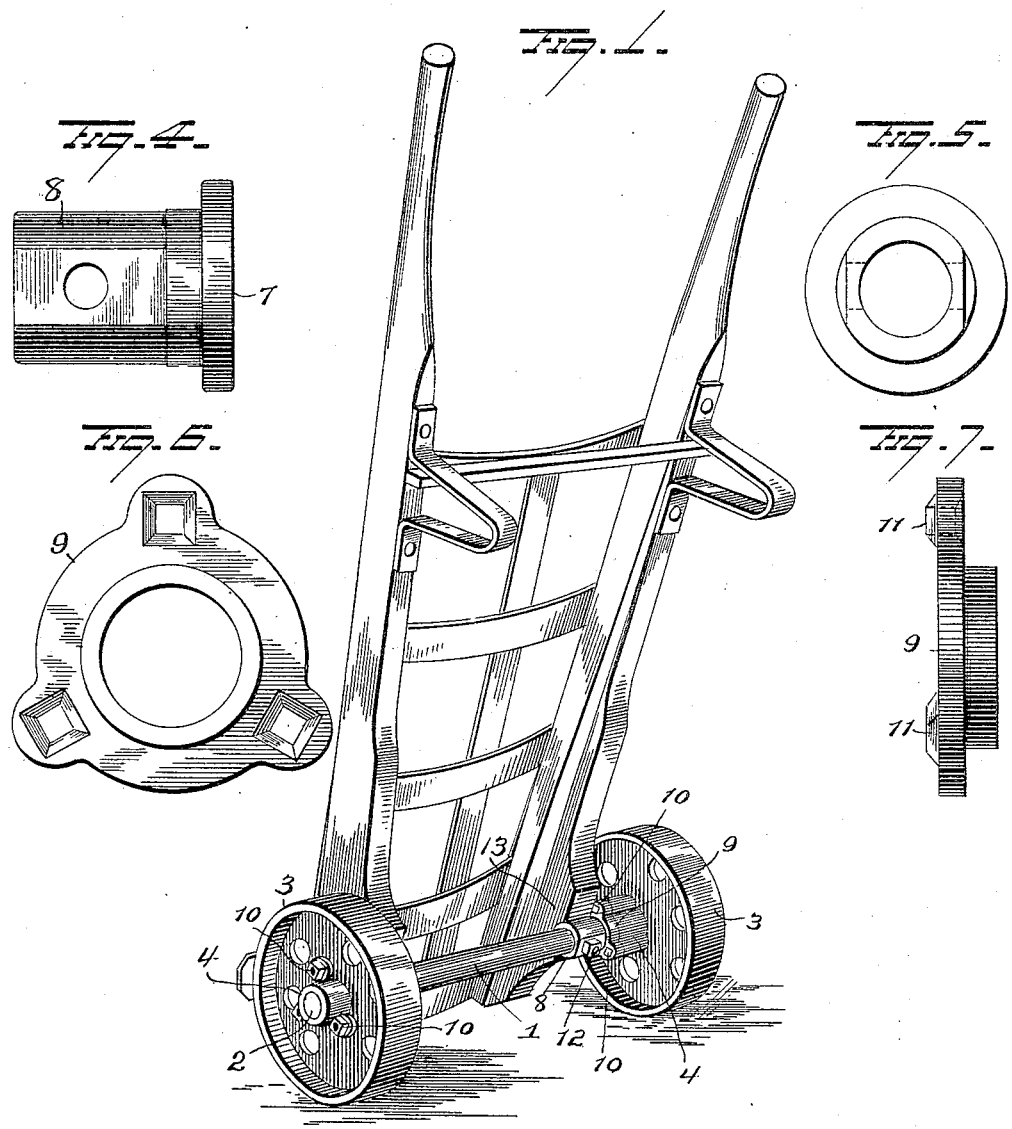
WITNESSES
INVENTOR
Attorney No. 838,967. PATENTED DEC. 18, 1906.
C. DUNCAN.
MEANS FOR ATTACHING WHEELS TO AXLES.
APPLICATION FILED NOV. 23, 1905.
2 SHEETS—SHEET 2.
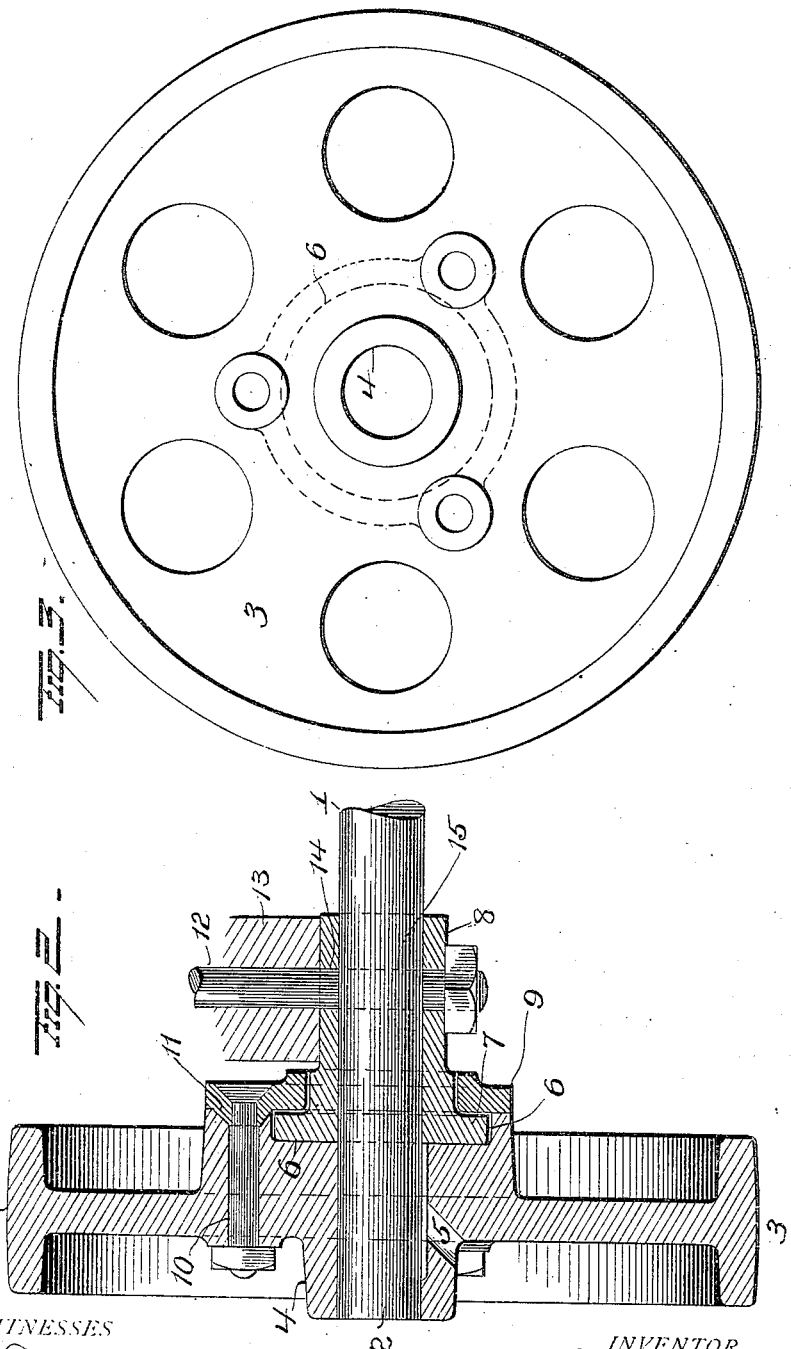

UNITED STATES PATENT OFFICE.

CONSTANTINE DUNCAN, OF HAMPTON, VIRGINIA.

MEANS FOR ATTACHING WHEELS TO AXLES.

No. 838,967.

Specification of Letters Patent.

Patented Dec. 18, 1906.

Application filed November 23, 1905. Serial No. 288,800.

*To all whom it may concern:*

Be it known that I, CONSTANTINE DUNCAN, of Hampton, in the county of Elizabeth City and State of Virginia, have invented certain new and useful Improvements in Means for Attaching Wheels to Axles; and I do hereby declare the following to be a full, clear, and exact description of the invention, such as will enable others skilled in the art to which it appertains to make and use the same.

My invention relates to an improvement in means for attaching wheels to axles, and is designed more particularly for use on warehouse and like trucks, agricultural implements, push-carts, &c.; and it consists in the parts and combinations of parts and in the details of construction, as will be more fully explained, and pointed out in the claims.

In the accompanying drawings, Figure 1 is a view in perspective of a truck, showing my improved axle and wheels secured thereto. Fig. 2 is a view in vertical section through one of the wheels and a section of the axle, showing the means for securing the parts together. Fig. 3 is a view in elevation of one of the wheels. Fig. 4 is a view in elevation of the flanged sleeve. Fig. 5 is an end view of the latter. Fig. 6 is a view in front elevation of the collar, and Fig. 7 is an edge view of the same.

1 represents the axle of a truck, barrow, push-cart, agricultural implement, or like device. For purposes of illustration I have shown it applied to a warehouse-truck; but I would have it understood that I do not limit its application to such a truck, but, on the contrary, claim the particular construction of wheel and the means for attaching the same to the axle and the latter to the truck irrespective of the construction of the latter.

The axle 1 may be of any shape in cross-section between its ends; but the latter are cylindrical to form the bearings 2, on which the wheels 3 turn. The wheels 3 are made of cast-iron, and each is provided with an enlarged hub 4, having a bore to receive its end of the axle, and an opening 5, through which oil or other lubricant may be introduced. The inner face of the hub of each wheel is provided with a recessed seat 6, circular in form and concentric with the bore, to receive the disk-shaped flange 7, integral with the sleeve 8. This flange 7 approximately fills the recess 6 and is locked thereon by the collar 9, which latter has an opening through which the sleeve 8 passes.

The hub of the wheel is enlarged at the points where the fastening bolts or rivets 10 for the collar pass through the same, as clearly shown in Fig. 2, and each of these enlargements is provided on its outer face with a mortise to receive the projection 11, stamped or cast on the inner face of the collar. With the collar thus secured to the hub of the wheel by three or more bolts or rivets and the projection on the inner face of the collar resting in the mortises in the hub all lateral strain and wear on the bolts or rivets, due to any tendency of the collar to turn on the sleeve, is avoided. The two sleeves thus formed and secured to the wheels are secured to the axle by bolts 12, passing through the sills 13 of the truck and through the two sleeves and axle, thus securing all the parts together.

In assembling the parts the flanged sleeves may first be secured to the wheels, and the two wheels, with their attached sleeves, then placed on the axle with the holes 14 in the sleeve in line with the holes 15 in the axle. By now passing the securing-bolts 12 through the sills of the truck and the holes 14 and 15 and securing them by nuts the parts will be secured together without danger of accidental displacement of the wheels.

It is also apparent that the sleeves and axle may be secured to the truck and the wheels then placed in position and secured by nuts engaging the outer ends of the bolts, and the wheels may also be removed by removing the nuts on the bolts which secure the collar to the hub without disconnecting the axle from the truck.

It is evident that changes in the construction and relative arrangement of the several parts might be made without avoiding my invention, and hence I would have it understood that I do not restrict myself to the particular construction and arrangement of parts shown and described; but, Having fully described my invention, what I claim as new, and desire to secure by Letters Patent, is—

1. The combination of a wheel having an integral hub provided in its inner face with a recess, an axle entering the hub, a sleeve on the axle and having an annular flange at one end seated in the recess in the inner face of the hub, a vehicle-frame, means securing the sleeve and axle together and to the vehicle-frame, and means connected with the hub and overhanging the annular flange of the sleeve to prevent the escape of said annular flange from the recess in the hub.

2. The combination of a wheel having a recess in the inner face of its hub, a sleeve having a flange fitting within said recess, a collar overlapping the flange of the sleeve and provided with a plurality of projections which fit within recesses in the hub, and bolts securing the collar to the hub.

3. The combination with a wheel having a recess in the inner face of its hub and concentric with the bore of the hub, a sleeve having a flange fitting within said recess, and a collar secured to said hub and overlapping the flange on the sleeve, of an axle passing through the sleeve, a truck, and a bolt passing through the sleeve and axle and attaching the same to the truck.

In testimony whereof I have signed this specification in the presence of two subscribing witnesses.

CONSTANTINE DUNCAN.

Witnesses:
  S. J. SCOTT,
  R. W. KEAR.